United States Patent
Nguyen

(10) Patent No.: US 9,888,114 B2
(45) Date of Patent: Feb. 6, 2018

(54) MULTIMEDIA ALERT AND RESPONSE SYSTEM FOR URGENT AND LOCAL REQUESTS

(71) Applicant: Phong Trung Nguyen, Sunnyvale, CA (US)

(72) Inventor: Phong Trung Nguyen, Sunnyvale, CA (US)

( * ) Notice: Subject to any disclaimer, the term of this patent is extended or adjusted under 35 U.S.C. 154(b) by 0 days.

(21) Appl. No.: 14/875,647

(22) Filed: Oct. 5, 2015

(65) Prior Publication Data

US 2017/0099385 A1  Apr. 6, 2017

(51) Int. Cl.
*H04M 3/42* (2006.01)
*H04W 4/02* (2009.01)
*H04W 4/22* (2009.01)

(52) U.S. Cl.
CPC ......... *H04M 3/42195* (2013.01); *H04W 4/02* (2013.01); *H04W 4/22* (2013.01)

(58) Field of Classification Search
CPC ...... H04M 3/42195; H04W 4/02; H04W 4/22
USPC .... 455/404.2, 412.1–414.2, 418–420, 456.1, 455/456.3, 456.6, 457, 550.1; 707/5, 100, 707/101, 104.1, 769, 949, 999.01, 999.1, 707/999.102, 999.107; 709/203, 217, 709/223, 202, 209, 219
See application file for complete search history.

(56) References Cited

U.S. PATENT DOCUMENTS

| | | | | |
|---|---|---|---|---|
| 6,437,743 B1 * | 8/2002 | Mintz | ................... | G01S 5/0027 342/457 |
| 7,828,202 B2 * | 11/2010 | Bregman | ............. | G06Q 10/087 235/376 |
| 8,781,727 B1 * | 7/2014 | Bonawitz | ............... | G05D 1/104 701/410 |
| 8,862,403 B1 * | 10/2014 | Piponi | ................... | G01C 21/20 701/410 |
| 8,874,356 B1 * | 10/2014 | Bonawitz | ............. | G08G 5/0034 701/120 |
| 8,880,326 B1 * | 11/2014 | Bonawitz | ................. | G08G 5/00 701/120 |
| 9,014,957 B2 * | 4/2015 | Bonawitz | ............. | G08G 5/0034 701/120 |
| 2001/0056396 A1 * | 12/2001 | Goino | ................ | G06Q 30/0601 705/37 |
| 2002/0052751 A1 * | 5/2002 | Ebata | ............... | G06Q 10/08355 705/417 |
| 2008/0294629 A1 * | 11/2008 | Gonen | ............. | G06F 17/30389 |
| 2009/0156241 A1 * | 6/2009 | Staffaroni | ........ | G06Q 10/06311 455/466 |
| 2012/0054119 A1 * | 3/2012 | Zecchini | ............. | G06F 17/3087 705/347 |
| 2014/0136305 A1 * | 5/2014 | Blumenthal | ....... | G06Q 30/0217 705/14.19 |
| 2016/0099895 A1 * | 4/2016 | Crawford | ................ | H04L 51/20 709/206 |

* cited by examiner

Primary Examiner — Babar Sarwar

(57) ABSTRACT

A Multimedia Alert and Response System for Urgent and Local Requests have been disclosed. In one version when an urgent request is received urgent rules are applied, a reverse call center is applied, and a service provider is connected telephonically with a live service provider person.

19 Claims, 8 Drawing Sheets

MULTIMEDIA ALERT AND RESPONSE SYSTEM FOR URGENT AND LOCAL REQUESTS

FIELD OF THE INVENTION

The present invention relates generally to a system that receives a request for service from a requestor (e.g. consumer) in any media format such as web, cell phone, SMS, etc., and then looks up the local service providers nearest to the location of the requestor, and then picks the appropriate service provider from its database using logic rules to connect back to the requestor to confirm the delivery of service. More particularly, the present invention relates to a Multimedia Alert and Response System for Urgent and Local Requests.

BACKGROUND OF THE INVENTION

The cellular phone market is currently experiencing an explosive growth of smart phones. One of the driving forces behind the smart phone market is the number of mobile applications available on a specific manufacturer's device. For Apple, the iPhone has seen tremendous growth since its introduction thanks to the thousands of mobile applications available in its App Store. One of the popular mobile applications in its store is Taxi Magic, which allows iPhone users to book a taxi cab without talking to the dispatcher of the cab company and be able to check status of its arrival using the GPS feature from the cab. Furthermore, it also allows users to pay for the cab fare by using a credit card on file. Taxi Magic will take the money from the user's credit card to pay to the cab company. There are many similar services from Apple, Android, Blackberry and other device manufacturers' mobile application stores.

There are similarities in these mobile applications. First, they rely heavily on the GPS feature of the handset to find the location of the taxi or location of the user. Second, they all deliver a booking service for taxi or other transportation for hire by either tapping directly into the cab companies' computer system, or directly into the booking meter of the individual taxi cab itself.

Booking service is one of the many applications that highlight the importance of immediate, urgent needs for interaction for business purposes or other purposes with specific locality. Other applications might be emergency trade services such as plumbing, electrician, roof repairs, emergency veterinarian service, road side assistance, trip assistance, etc. all about the immediate, urgent needs for interaction with a near in location provider. The aforementioned services address the booking or confirmation of the request for services, but they do not provide a live mechanism for all parties to interact to conduct business. This presents a problem.

As such, a need exists for a system that can provide to its users the needed live interaction with a local provider without the user having to know the provider's phone number, contact information, or even location so long as the provider provides service coverage of the area where the requesters would be. Such a system, in order to be useful, must be able to receive requests in any media format available to the end users, whether or not it's from the Internet, the mobile handset itself, or through texting (Short Messaging System or SMS and its variations). This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

Figure 1:
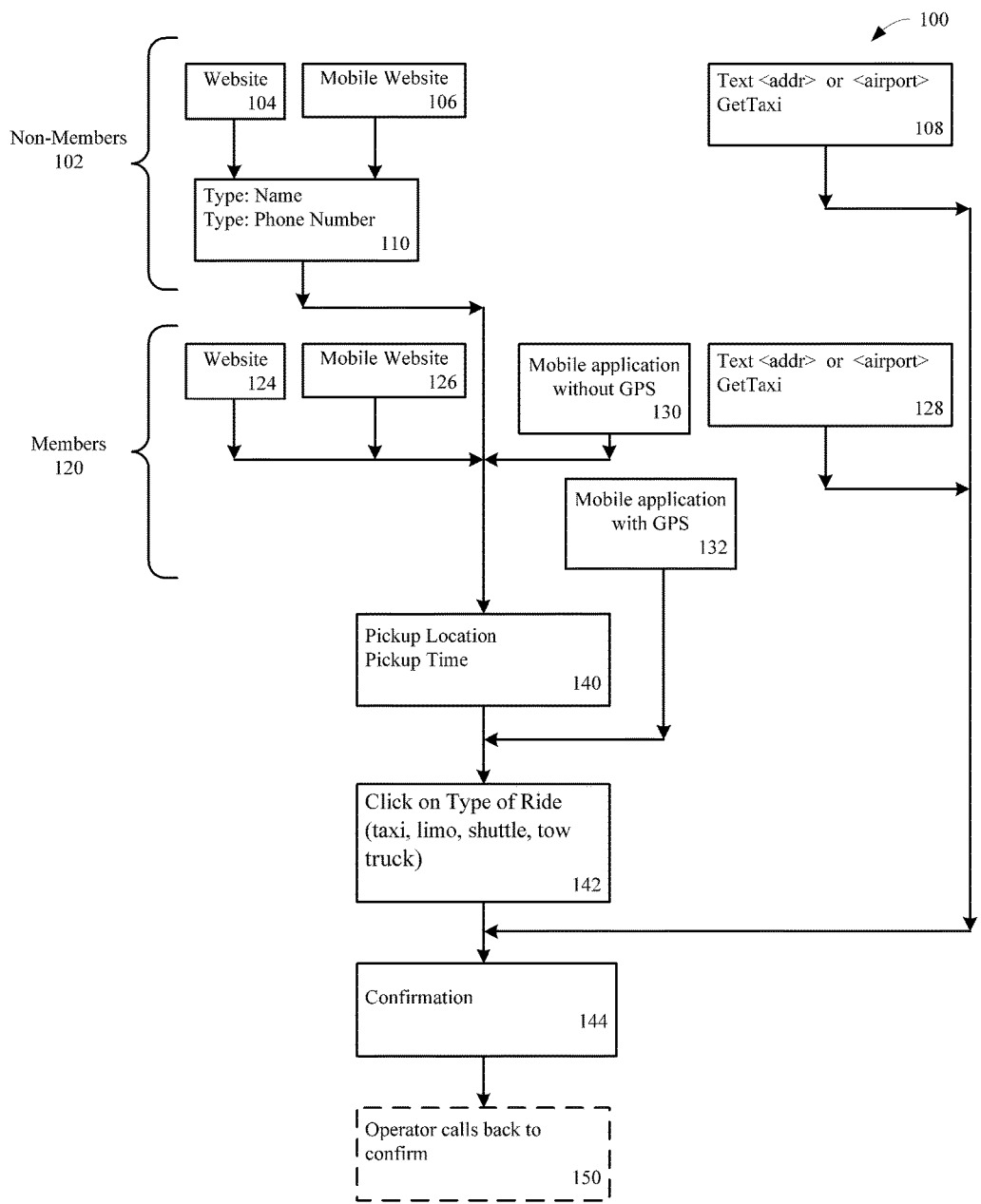
FIG. 1 illustrates one embodiment of the invention showing in flowchart form non-member and members.

A Multimedia Alert and Response System for Urgent and Local Requests is disclosed.

In one embodiment the invention provides a system that is capable of receiving requests from users in any media, looks up the providers or operators within a predefined distance or nearest location of the requestor, then connects the available provider to the requestor by rich media (phone, text, or any combination of available media). The request contains the type of service, the phone number of the requestor and the requestor's location (either by direct input or by geo-location of the input channel such as cell phone). It is noted that when the system looks up its database for the appropriate service provider based on the location of the requestor, it also applies certain provider's logic rules and/or user-defined rules that allow both the providers and requestors to optimally match up their services versus the requestors' preferences.

In one embodiment the invention provides a voice connection based on locality and urgency between the requestor and a service provider, a source of information, or any body or agency who might be able to satisfy the needs of the requestor.

In one embodiment the invention provides a means for locating an available service provider or "desired" provider without the need for the requestors to know anything about the providers such as its location, contact information. In this embodiment, "desired" is defined by certain process or personal rules such as, but not limited to, "least expensive provider for transportation in this location". "Locating an available service provider" means that the system must be able to verify that a live agent is ready for live voice connection or the system should look for another "desired" provider in its stored database. A live agent is any member or representative of the service provider that is available to be connected to the requestor. Such live agent can be a person, or an available mechanism to be contacted by the requestor to communicate about the need for the service to fulfill it in any rich media.

In one embodiment the invention enables a live interaction between the requestor and the "desired" service provider within the preferences of the requestor. For example, a taxi requestor can preset his preferences to only allow taxis with a latest cab model, or those with large family capacity can respond to his taxi request, resulting in a live phone connection between them.

In one embodiment the invention automatically provides a loyalty program to the requestors and the providers given the knowledge of all activities between them over time in the system. A loyalty program is a method within which a frequent use of the services rendered by a certain provider will result in some form of reward, bonus, benefit, or preferred treatment from the provider for future use.

In one embodiment of the invention there is an array of input channels for the request such as web sites, mobile web sites, mobile applications, texting (SMS), etc.

In one embodiment of the invention there are server applications behind (e.g. to handle) such input channels to process the requests, to store and manage user information, preferences or user defined rules of engagements, membership, etc, as well as to store and manage providers' information, promotions, rates or fee schedules, etc.

In one embodiment of the invention there are connections to a telephony/media server or system to process and handle voice or any rich media connections based on the provider defined rules and/or the user defined rules and system rules to establish a selected connection. For example, the call back portion of the service using the reversed call center approach (i.e. calling each of the eligible service providers first) to find an available service provider and once found, connect the service provider to the requestor. Such setup of a reversed call center call flow would abate the need for a call center to have a ACD (Automatic Call Distributor) and IVR (Interactive Voice Response) units to front all incoming calls and prompt them to find out what the callers need, and then connect the callers to the right agent, only to find out that the agent might not have time or too busy to speak with the caller.

In one embodiment of the invention there is a process to confirm the service requested and to allow the users to acknowledge that the service has taken place for further follow up actions, reports, or a supplemental chain of actions to complete a purpose, goal, or objective of which the original service is a part. For example, if this process is used to hail a taxi then the end result of a ride can be confirmed and recorded.

In one embodiment of the invention these functions are included:

1. An array of input channels for the request such as web sites, mobile web sites, mobile applications, texting (SMS), etc. The request coming from the requestor can be from any of those channels to trigger a live connection in any of those channels.
2. Server applications handling the input channels to process the requests, to store and manage user information, preferences or user defined rules of engagements, membership, etc, as well as to store and manage providers' information or logic such as special rate for members of certain associations, promotions, rates or fee schedule, etc. There are referred to as backend.
3. A connection to a telephony server or system to process and handle voice connection based on the logic rules or user-defined rules to establish the "desired" connection. This is the call back portion of the service using the reversed call center approach i.e. calling each of the suitable service providers first to find an available agent and once found, connect the service provider to the requestor. The telephony server or system may be hardwired or wireless or a combination of both (e.g. POTS (plain old telephone service), WiFi, WiMax, smartphone, radio, etc.).
4. A process to confirm the service requested and to allow the users to acknowledge that the service has taken place for further follow up actions, reports, or a supplemental chain of actions to complete a purpose, goal, or objectives of which the original service is a part (such as post service payment or service rating) This may be part of the backend.

In one embodiment of the system provides instant connection using a reversed call center for an urgent AND local service request where the service request is time sensitive as well as location sensitive, and the best way to satisfy this request is to have a live, instant voice interaction between the requestor and the service provider.

In one embodiment of the invention, instead of the requestor just dialing the service provider's main phone number and risk not being able to have a connection or suffer a long wait for available agent, a reversed call center approach is used to find a live person to connect to the requestor. The reverse call center approach is to check the availability of the agent (service provider) first using his/her working schedule, and then following any popular routing technique such as sequential call routing, round robin call routing, etc. to find a live agent before connecting to the user to avoid a long wait time for the requestor.

In one embodiment the invention makes an urgent request in any media of choice and has the appropriate service provider call back the requestor to confirm the service in a specific location or any location or the service may be constrained to a well defined locality.

In one embodiment the invention after receiving a service request into the system will follow the requestor's choice of rules (e.g. user defined rules) and/or service provider rules and/or system preferences to select an appropriate service provider.

In one embodiment the invention allows the consumer (e.g. user, requestor) not only to place a request for an urgent service using a preset rule or process, but also allows tracking of such service for the purpose of payment, monitoring, controlling, loyalty program creation, and other post service actions.

In one embodiment the invention delivers or offers road side assistance service without the need for live agents. A road side assistance service is a set of actions triggered by a motorist (e.g. user, requestor, customer) requesting help for their trip/journey in an urgent manner, and in a specific location at the time of the request. The actions normally started with the motorist contacting the road side assistance program's main service center by phone indicate the need for service. The agent within the service center then confirms the service request by verifying the motorist's identity and affiliation, such as, but not limited to, a valid membership to the road side assistance program, as well as the nature of the requested service. Once confirmed, the agent would contact a service provider within its affiliation who is in the vicinity or locality to the requestor to setup the delivery of the service to the requestor. The system facilitates all the aforementioned tasks and provides a direct connection between the requestor whose credentials are verified by virtue of their membership profile and the local service provider affiliated with such road side assistance service, as such bypassing the need for contacting the main service center only to be dispatched to a nearest affiliated service provider. This can also work for taxi cab companies (getting booked directly with the cab drivers instead of going through the main taxi dispatching center), or any organizations whose members can be directly connected to the requestor to satisfy their needs based on their own preference, profile, and the service provider's rules.

In one embodiment the system delivers urgent service to the consumer(s) with specific locality, service criteria, and within preset rules set by the consumer(s) without either party (e.g. the consumer and the service provider) knowing the respective phone numbers nor identity of the other party and having at the convenience of the consumer(s) all the communications through the consumer(s) preferred channel of communications.

For example, it is not necessary for the requestor or the provider to know the identity of the other to request and to provide a service as the system can handles dispatching and billing for the service.

In one embodiment the providers of services can make visible to the requestors the different types of offerings, promotions, or ad hoc services they provide such that they would be chosen as the "desired" provider for the requestors. For example, if a limo company decides to offer a free bottle of champagne for each ride in their limo service, such a promotion would be visible to those requestors who have a promotion preference selection (e.g. via user defined rules), i.e. they want to select providers with special offerings or promotions, and hence these user defined rules would elevate the priority of the system to choose such providers over others who do not have any promotion at the time of the request.

In one embodiment the system provides a rich media response that also delivers a loyalty program through its tracking of services and requests from all parties. That is, many service providers would love to be able to attract and retain their regular users, and the loyalty program is one of the best ways to achieve such a goal. The system by having service tracking on the provider side, and a convenient, easy to use, and automatic tracking of past usage on the consumer side allows for this type of program. Conversely, the users would like to not only keep the same service provider due to their quality and pleasant service, but also would like to be benefited from such loyalty program without the hassle of keeping track of their own usage in order to collect them.

In one embodiment the invention provides a multi media response system that allows both the requestors to impose rules of engagements (e.g. preferences) while the providers can showcase their offerings (e.g. promotions, discounts, specials) instead of other user-agnostic booking tools.

In various embodiments of the invention consumers are anyone who might be using the service or is using the service. A ride may be for example, but not limited to, a taxi ride. Members are registered consumers. Operators are service providers such as, but not limited to, taxi operators, limo operators, veterinarians, plumbers, electricians, emergency rooms, physicians, police, fire stations, CPR certified people, etc.

FIG. 1 shows, generally at 100, one embodiment of the invention showing in flowchart form high level functions of such system based on the example of a taxi booking (local and urgent request for transportation) service.

In FIG. 1 there are two types of users, non-members 102 and members 120. As noted above members are registered consumers. A non-member 102 can use the services by visiting a website 104 or a mobile website 106. When a non-member 102 uses the website 104 or the mobile website 106 then at 110 they need to enter their name and phone number so that this information is available. A member 120 uses a website 124 or mobile website 126 the member's name and phone number is stored and so they need not enter this information again. A member 120 who uses a mobile application without a GPS 130 also need not enter a name and phone number as this is stored as part of the customer registration process to become a member. In any of these cases the non-member 102 or member 120 proceeds to input a pickup location and a pickup time 140. Then at 142 more details on the type of ride is input, such as, taxi, limo, shuttle, tow truck. Then there is confirmation 144 and optionally an operator calling back to confirm 150.

Both non-members 102 and members 120 can text an address that they are at or the name of an airport where they are at and a phrase to summon a taxi like "GetTaxi" at 108 and 128 respectively, which then goes directly to a confirmation 144 and optionally an operator calling back to confirm 150.

Figure 2:
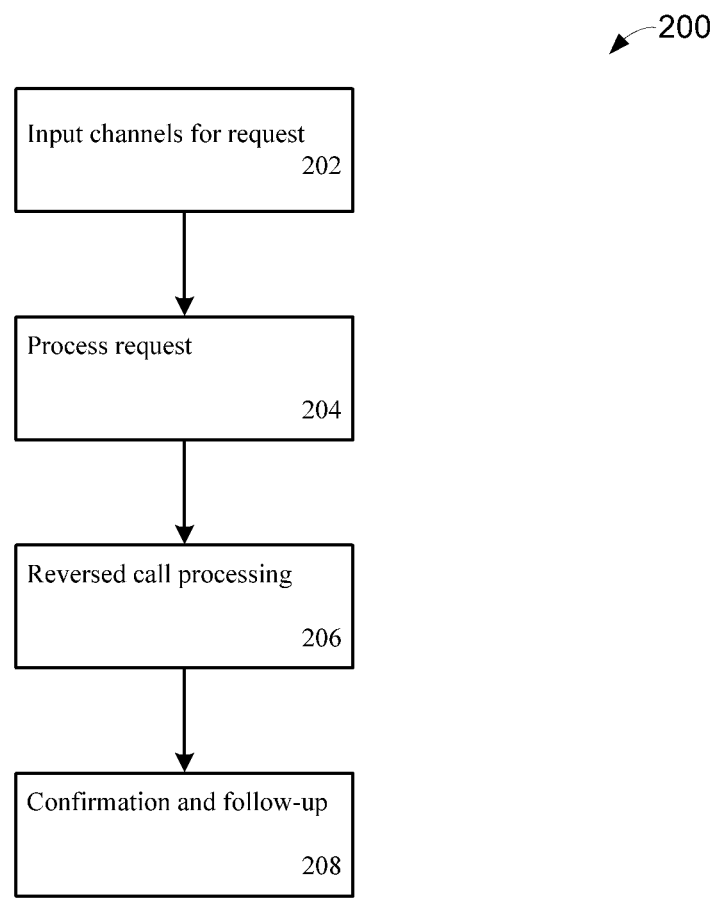
FIG. 2 illustrates one embodiment of the invention showing high level functions.

FIG. 2 shows, generally at 200, one embodiment of the invention showing in flow chart form high level functions. At 202 are a variety of input channels for a request or requests. At 204 the request is processed. At 206 reversed call processing is done, and at 208 confirmation and follow-up is performed.

In one embodiment, such as illustrated in FIG. 2 at 202, there are an array of input channels for the request such as web sites, mobile web sites, mobile applications, texting (SMS), etc.

In one embodiment, such as illustrated in FIG. 2 at 204, there are server applications behind such input channels (from 202) to process the requests, to store and manage user information, preferences or user defined rules of engagements, membership, etc, as well as to store and manage providers' information, promotions, rates or fee schedule, etc.

In one embodiment, such as illustrated in FIG. 2 at 206, there is a connection to a telephony server or system to process and handle voice connections based on the business rules or user-defined rules to establish the "desired" connection. This is the call back portion of the service using the reversed call center approach i.e. calling each of the "desired" service providers first to find an available agent and once found, connect the service provider to the requestor.

In one embodiment, such as illustrated in FIG. 2 at 208, there is a process to confirm the service requested and to allow the users to acknowledge that the service has taken place, and for further following up actions, reports, or a supplemental chain of actions to complete a purpose, goal, or objectives of which the original service is a part. For example, but not limited to, a confirmation communication that the member or non-member is entitled to a discount on future services.

Figure 3:
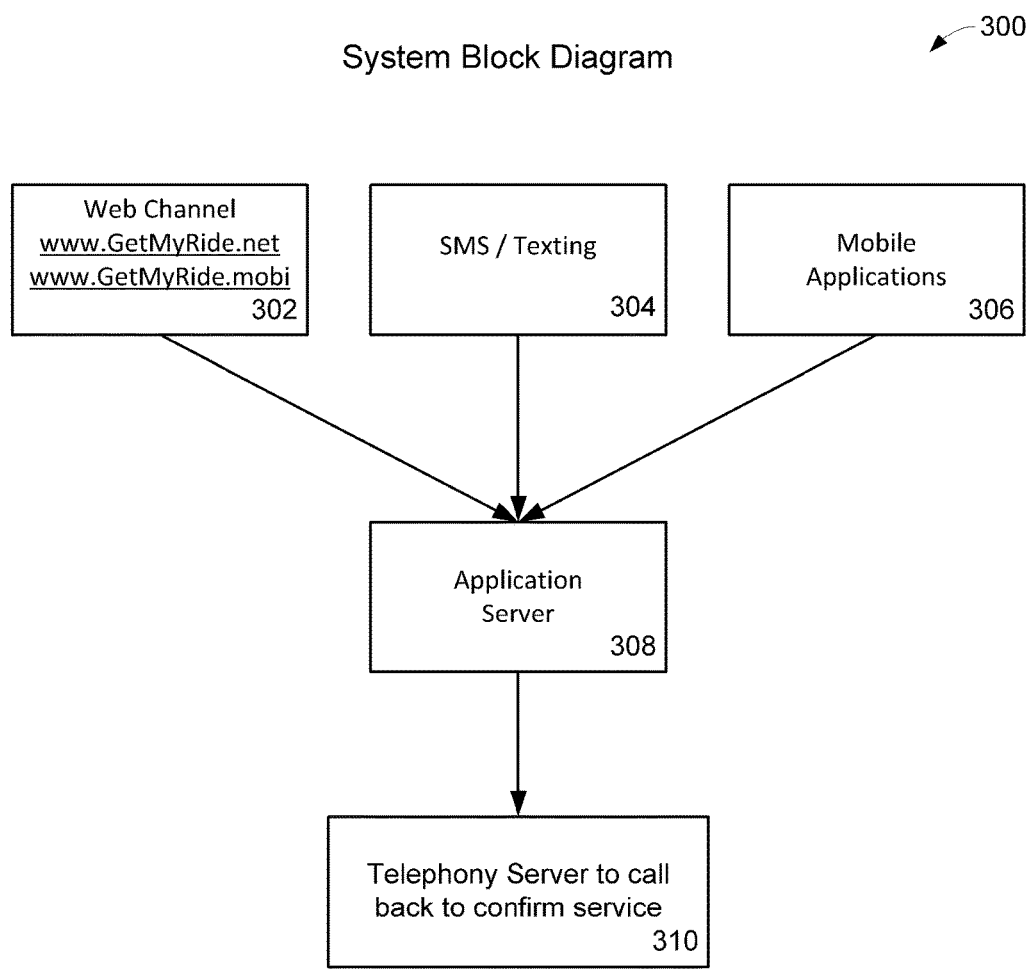
FIG. 3 illustrates one embodiment of the invention showing a system block diagram.

FIG. 3 shows, generally at 300, one embodiment of the invention showing a system block diagram. At 302 is a representative input web channel 302. Shown in 302 are two websites, for example, www.GetMyRide.net and www.GetMyRide.mobi. At 304 is a representative input showing SMS and texting. At 306 is .a representative input as mobile applications. All inputs, in this example 320, 304, and 306 are routed to an application server 308. The application server 308 is in communication with a telephony server to call back the user to confirm services.

In one embodiment, such as shown in FIG. 3, the user is the requestor.

In one embodiment, such as shown in FIG. 3, the user is the service provider.

In one embodiment, such as shown in FIG. 3, blocks 302, 304, and 306 describe the different input channels that the system is able to receive. From the Internet browser on a desktop computer to a browser on the cell phone (e.g. 302), all web enabled devices can send a request for service to this system. One of skill in the art will appreciate that other inputs are available as well, for example, but not limited to voice recognition, a panic key fob, etc. and that the implementation can be drastically expanded to include many other technological possibilities of entry points. For example, 304 describes a text messaging system using SMS or Short Messaging Service protocol. Currently, there is an advanced version call MMS or Multimedia Messaging Service whereby video and other images can be sent instead of just text with SMS.

In one embodiment, such as shown in FIG. 3, block 308 depicts the application server in which all logistics of consumers' profiles, service providers' profiles, rules regarding provider selection, etc. are handled all based on the processing of the request coming from one of the previously supported channels (e.g. 302, 304, 306). It is also the application server that enables post service processes, actions, or subsystems based on pre-defined goals.

In one embodiment, such as shown in FIG. 3, block 310 shows the telephony subsystem that handles the live voice interaction between two different parties based on a set of pre-defined rules. This system will perform the "reversed call center" search, which is comprised of a find-me-follow-me search for the individual service provider using an overall logic work flow (e.g. start with highest ranked provider and work down the list).

Figure 4:
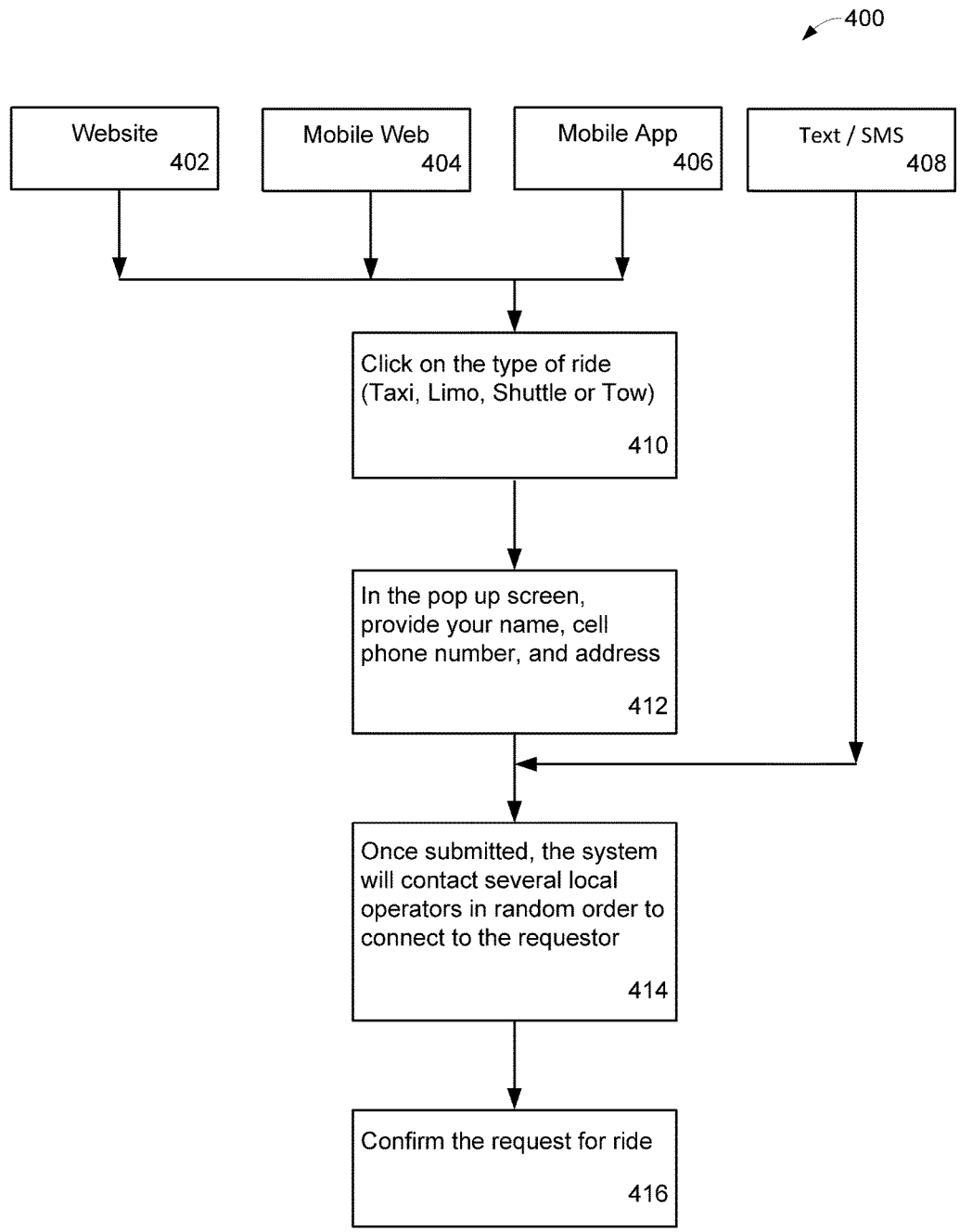
FIG. 4 illustrates one embodiment of the invention showing communication flows for a non-member.

FIG. 4 shows, generally at 400, one embodiment of the invention showing a process to request a ride by a non-member. A non-member can input a request via 402 a website, or via 404 a mobile website, or via 406 a mobile application or via 408 a text/SMS input. For inputs via 402 a website, or via 404 a mobile website, or vial 406 a mobile application the non-member next clicks on the type of ride desired 410, for example, but not limited to a taxi, a limo, a shuttle, a tow, etc. The non-member next needs to provide their name, cell phone number, and address 412. In one embodiment this non-member information (name, cell phone number, and address) would be entered into a pop up screen. This non-member information (name, cell phone number, and address) is communicated to a system that then contacts several local operators in random order to connect with the requestor who in this case is a non-member 414. At 416 there is confirmation of the request for a ride. This confirmation is to the non-member. Without being a member (i.e. a non-member) there are no stored preferences and so the system uses a random selection for the provider. That is the non-member requestor has no choice in the system selection of a provider. If the non-member provides an input via 408 a text/SMS input then the system proceeds to continue processing at 414. This is possible because the non-member's cell phone number, name, and address are either entered or retrieved. For example, if the non-member's cell phone number is not blocked it can be received by the system. Likewise the non-member's name and location may be entered by the non-member.

Figure 5:
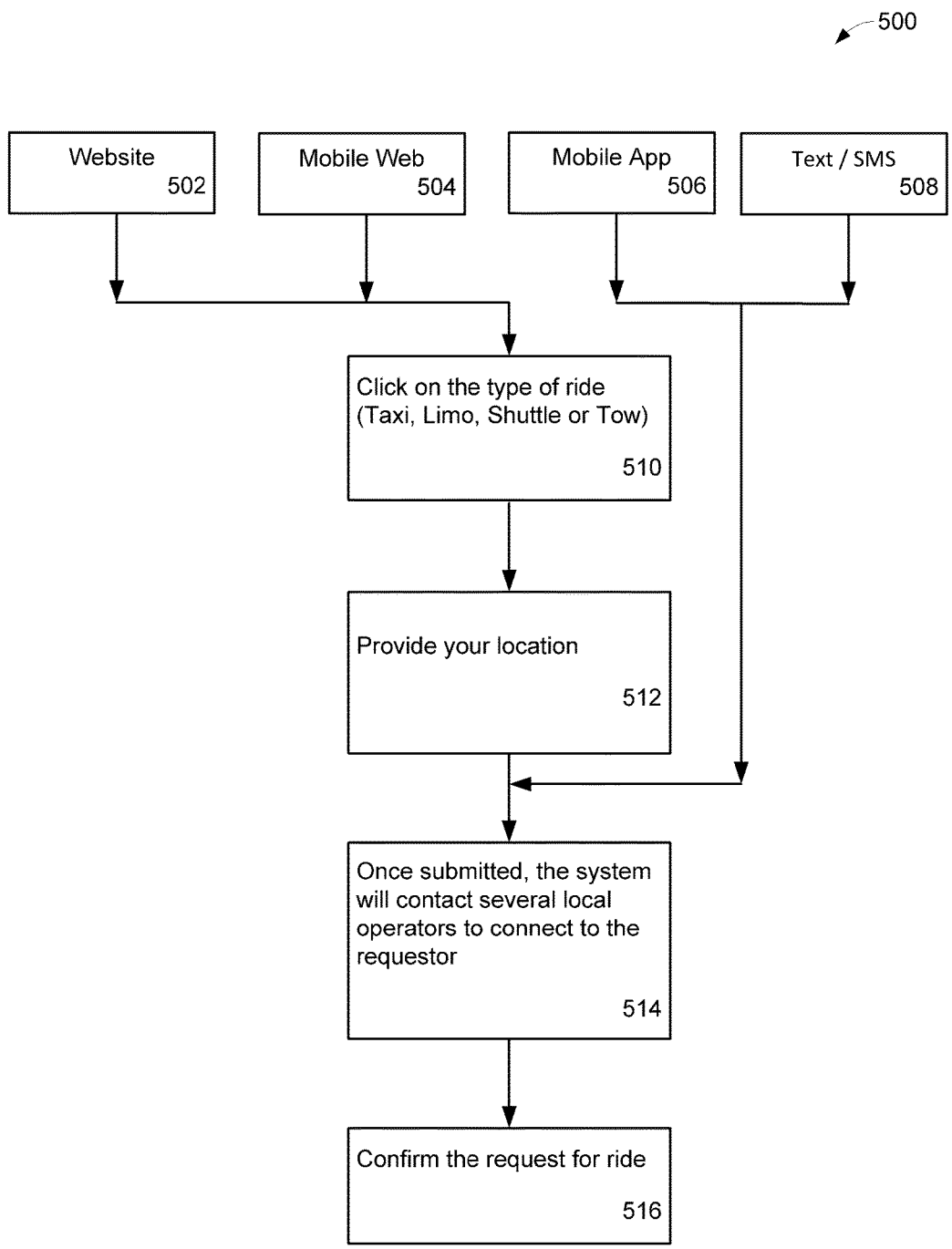
FIG. 5 illustrates one embodiment of the invention showing communication flows for a member.

FIG. 5 shows, generally at 500, one embodiment of the invention showing a process to request a ride by a member. A member can input a request via 502 a website, or via 504 a mobile website, or via 506 a mobile application or via 508 a text/SMS input. For inputs via 502 a website, or via 504 a mobile website the member next clicks on the type of ride 510, for example, but not limited to a taxi, a limo, a shuttle, a tow, etc. The member next needs to provide their current location 512 (for pickup). This member location is communicated to the system that then contacts several local operators in order to connect with the requestor who in this case is a member 514. At 516 there is confirmation of the request for a ride. This confirmation is to the member. By being a member there are stored preferences and so the system uses these preferences or a system designated selection for the provider. That is the member requestor has a choice in the system selection of a provider. In one embodiment, if the member does not have a stored preference the system has a default list of preferences for providers. In one embodiment this system list of preference providers may be based on factors other than purely location, such as, but not limited to members' feedback on quality of the service provider. If the member provides an input via a mobile app 506 input or a via 508 a text/SMS input then the system proceeds to continue processing at 514. This is possible because the member's cell phone number, name, and address are either entered or retrieved. For example, if the member's cell phone number is not blocked it can be received by the system. Likewise the non-member's name and location may be entered by the non-member. Also using the mobile app 506 the application may access a GPS to retrieve and then send to the system the cell phone location running the mobile app 506.

In embodiments of the invention, for example, but not limited to FIG. 4 and FIG. 5, the system is loaded with information about the service providers for proper geographical coverage, for example, for each city listed in a covered area, there is an operator to provide the service. The objective of the request process (e.g. request for transportation services) is to identify the phone number and location of the requestor so that the system can call to identify an available agent at the provider's end to dial back to the requestor to connect the two parties together for confirmation. Since there are many different channels of communications available to the system, the most popular channels are as illustrated (e.g. website, application, text/SMS, etc.). The requestor's location is needed so that the system can select the appropriate operators (service providers) in the local area to connect to the requestor (see Connection Process described below). The local area is defined as the city or region within which the operator is providing services. The phone number of the requestor is needed so that the system can call back to the requestor to connect the operator to form a live interaction to conduct business.

For the web channel (Internet or Mobile Internet), the phone number and location are both needed for non-members to carry out the operation of looking up of local operators and connecting to them. If the requestor is already a member and is logged in, the system already has the phone number of the member (requestor) so only the location of the member is needed to complete the member's request. For the requestor who uses the mobile application but did not sign up as a member, the non-member's phone number and location are needed since we do not know that information in advance. However, if the requestors are already members of the service, then we can obtain their phone number and location from their smart phone device to perform the connection service.

For texting, the requestor would send in their location and ride request to our short code destination, for example an world airport code (e.g. IATA or ICAO) (e.g. LAX for Los Angeles, Calif.; SJC for San Jose, Calif.; LFPG for Paris, France. From there, the system will make attempts to call local operators by phone to connect to the requestor (see the Connection Process below).

Figure 6:
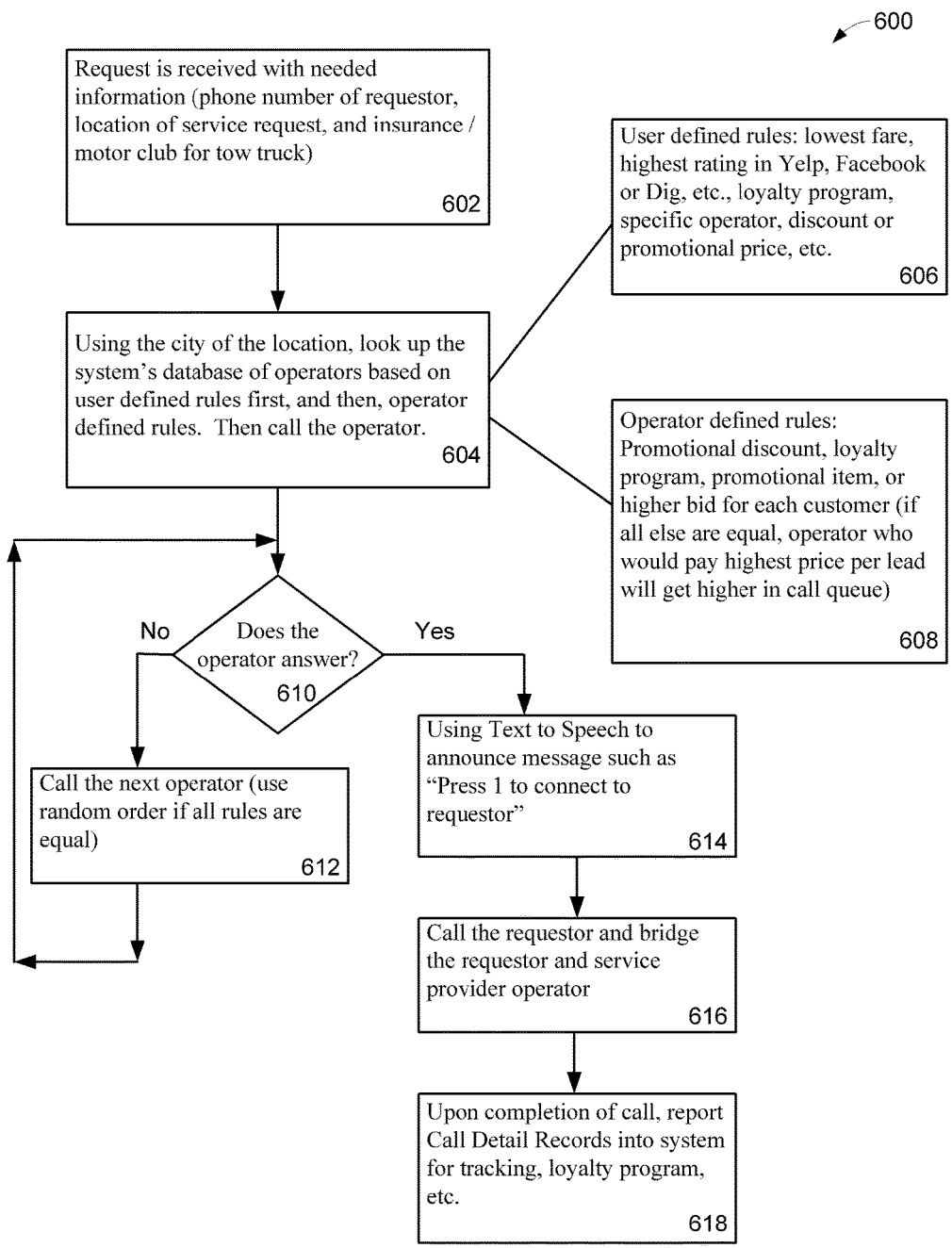
FIG. 6 illustrates an embodiment of the invention showing rule usage and calling sequences.

FIG. 6 shows, generally at 600, one embodiment of the invention. At 602 a request is received from a requestor with information necessary for the system to start the processing of the request, for example, but not limited to phone number of requestor, location of service request, insurance/motor club number for a tow truck, limo service, number of people, etc.

At 604 the system received the requestor information and using that plus information stored in a database identifies possible service providers (also called operators) that may be able to provide the requested service. A list of possible service providers is created. In the embodiment shown at 604 the system uses the city of the location of the service request to look up in the system's database those operators based on user-defined rules first, and then second, operator-defined rules. The operator first on that list is then called At 606 are user defined rules that the system at 604 has access to. At 608 are operator (also called service provider) defined rules that the system at 604 has access to.

In one embodiment as shown at 606 the user defined rules consider such factors as, but are not limited to, lowest fare, highest rating in Yelp, Facebook, and/or Dig, etc., loyalty program, specific operator, discount or promotional price, etc.

In one embodiment as shown at 608 the operator defined rules consider such factors as, but are not limited to, promotional discount, loyalty program, promotional item, or higher bid for each customer (if all else are equal, operator who would pay highest price per lead will get higher in call queue).

At 610 it is determined if the operator answered the call. If the operator at 610 does not answer the call (No) then a 612 the next operator on the list is called. Not shown so as to not obfuscate the essence of the invention, if no operators answer or an operator cannot be located then the system can contact the requestor and indicate such.

If the operator at 610 does answer the call (Yes) then at 614 a message is communicated to the operator on how to communicate with the requestor. At 614, is one example, by using text to speech to announce a message to the operator, such as "Press 1 to connect to requestor." One of skill in the art will appreciate that the system by the use of the user defined and operator defined rules can accommodate a variety of situations. For example if a French speaking traveler lands in San Francisco this traveler may want a service provider that speaks French. Accordingly, the system may find a service provider that speaks English, Spanish, and French and so the text to speech message at 614 may prompt as follows "Requestor wishes a French speaking person, Press 1 to connect, Press 2 to tell the requestor that the French speaking person is being located and to please stand by."

The service provider and the requestor are then put in verbal communication. In one embodiment as shown in FIG. 6 at 616 the requestor is called and the system bridges the requestor and the service provider operator so that they can verbally communicate.

At 618 after the call is completed addition action and details may be recorded. For example, as shown at 618 upon completion of the call, report Call Detail Records are entered into system for tracking, loyalty program, etc. purposes.

Not shown so as to not obfuscate the essence of the invention, if no answering operators cant be located then the system may try another answering operator and if none can provide the service the system can contact the requestor and indicate such.

In one embodiment, for example, as illustrated in FIG. 6, using a voice call as the response channel, the FIG. 6 flowchart depicts how the system handles the request. Based on the information provided by the requestor, it locates operators based on the user's defined rules (preferences such as lowest fare operator, highest rating operator, or an operator who provides loyalty rewards to its clients). After the look up is done using the requestor's rules (user defined rules), the system then subjects its search to the operator defined rules such as higher bid per customer, bigger discount to clients, etc. to attain a higher position in the selection process (provider list) or to differentiate themselves. Once done, the system will call the highest ranking operator based on all previous rules. If there is more than one operator having the same ranking, then the first operator will be selected by the system in random order. Each operator will have a chance to pick up the phone call, and press 1 or any requested number to indicate a live person is handling the call. Once the system receives the tone of the requested digit, it will then call back the requestor to connect the two together by voice.

Other channels of communication can also follow similar logic of this voice connection to connect an available operator to the requestor. Of course each media channel will have its own unique way of communicating to enhance the customer experience. For example, but not limited to, one channel of communication could be video (e.g. FaceTime, Skype, Tango, etc.).

Many of the embodiments above have used transportation to illustrate features of the present invention, however it is not so limited.

What is to be appreciated is that without knowing a specific service provider the user (requestor) can request a service and the system will locate such and put the user and service provide in contact.

For example, if someone is having a heart attack (sudden cardiac arrest (SCA)) a bystander could and should call 911, however they may not respond in time and so cardiopulmonary resuscitation (CPR) should be administered by someone who knows CPR. If the bystander uses the disclosed system and they are a member they would enter only CPR on their smartphone (location and phone number known) and immediately they would be put in contact with a person (service provider) that might be a certified CPR person. This person might be right next door or nearby, that is seconds away from being able to help. The system upon receiving such a call could also automatically call 911 and provide required information to medical personnel. Additionally if the user has the mobile application additional communications and immediate input is possible. For example, entering the approximate age of the person suffering the SCA.

Such an application is very important as every two minutes, one person dies in the US from SCA, so there is no time to waste. There are over 400,000 sudden cardiac arrest cases per year in the US, and only around 8% of them survived for the past decade or so, making SCA the leading cause of death. As a matter of fact, according to the American Heart Association, SCA kills more people than HIV, cervical cancer, breast cancer, freeway deaths, and house fire deaths combined. Yet it is so simple to save them: all it takes is for a bystander to perform CPR on the victim, and summon the paramedic or anyone who has the AED (Automated External Defibrillator) to shock the heart back to its rhythm. However, less than 3% of bystanders know what to do, but there are around 45 million people who know CPR in the US. This invention can connect any bystander to the nearest CPR person as well as to the nearest AED owner with one single request to save a life.

While the above description has illustrated providers being ranked and selected based on requestor rules, providers rules, and processing center rules, there are situations where the requestor rules, for example for a discount, and providers rules for loyalty, and system rules for a highest bidder may be overridden by the system. A CPR request for example would disregard all the other rules and knowing that it is an urgent time sensitive request would rank the service providers on who can provide the service fastest or with least delay. What is to be appreciated is that the system does have priorities and those may override any other rules.

Figure 7:
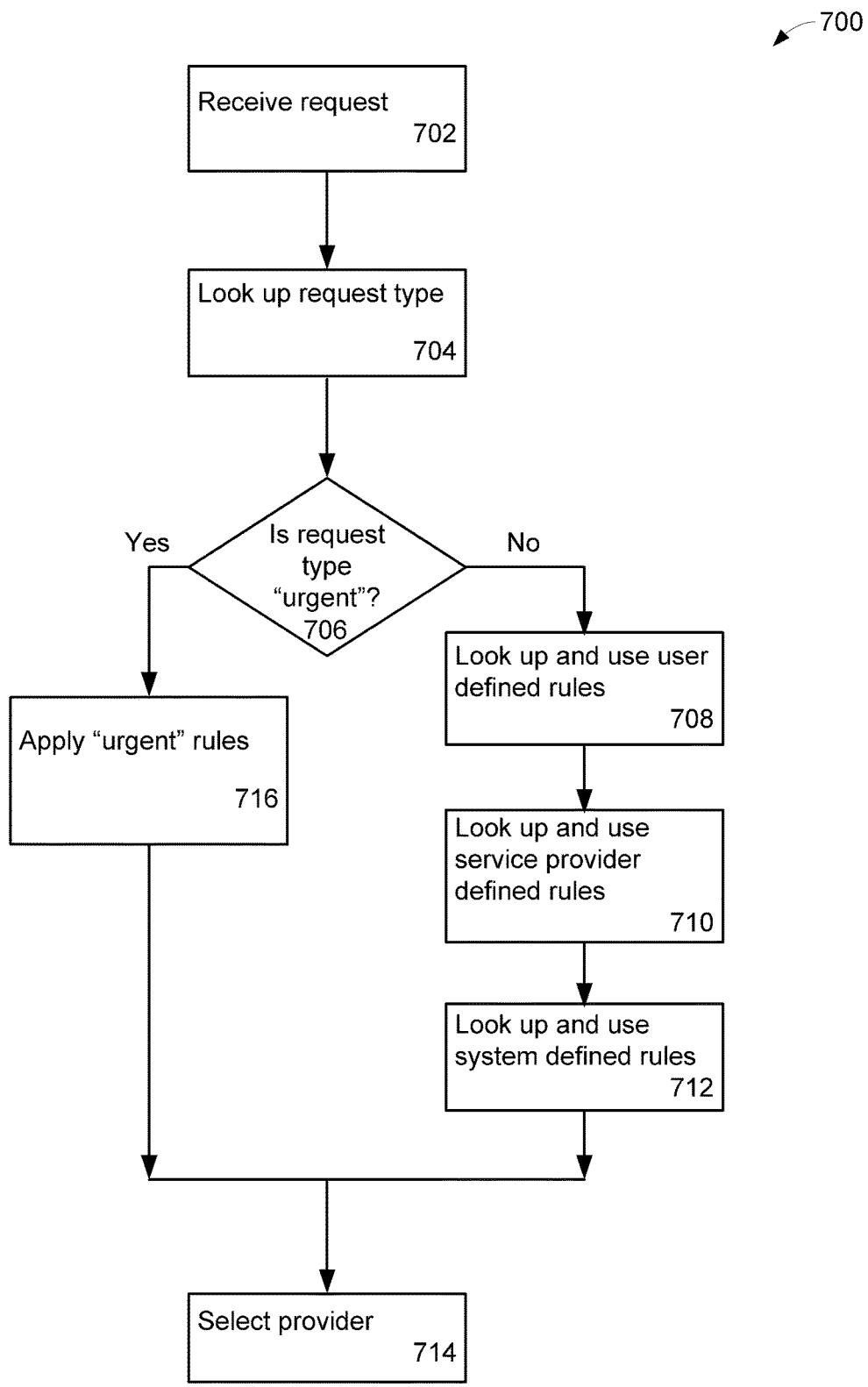
FIG. 7 illustrates an embodiment of the invention showing rules interaction.

FIG. 7 illustrates, generally at 700, one embodiment of the invention showing rules interactions. At 702 the request is received by the system. At 704 the request type is looked up. At 706 the request type is checked to see if the request is of the type urgent. If the request type at 706 is not urgent (No) then at 708 user defined rules are looked up and used, as are at 710 service provider rules are looked up and used as are at 712 system defined rules are looked up and used to select the provider at 714. If on the other hand, at 706 it is determined that the request is of the type urgent (Yes) then at 716 urgent rules are applied in the selection of the provider at 714. If the rules are determined at 706 to be of the type urgent then the urgent rules are applied at 716 to select the provider at 714 without regard to any existing user defined rules, without regard to any existing service provider defined rules, and without regard to any existing system defined rules other than the urgent rules if considered to be system defined rules. What is to be appreciated is that urgent rules override all others period.

Urgent rules may include, but are not limited to, calling more than one (possibly all) service providers in a region (predefined area) simultaneously. That is a normal ranked provider list where one provider is called before another is called (such as shown in FIG. 6 at 604, 610, 612, etc.) may not be followed.

Figure 8:
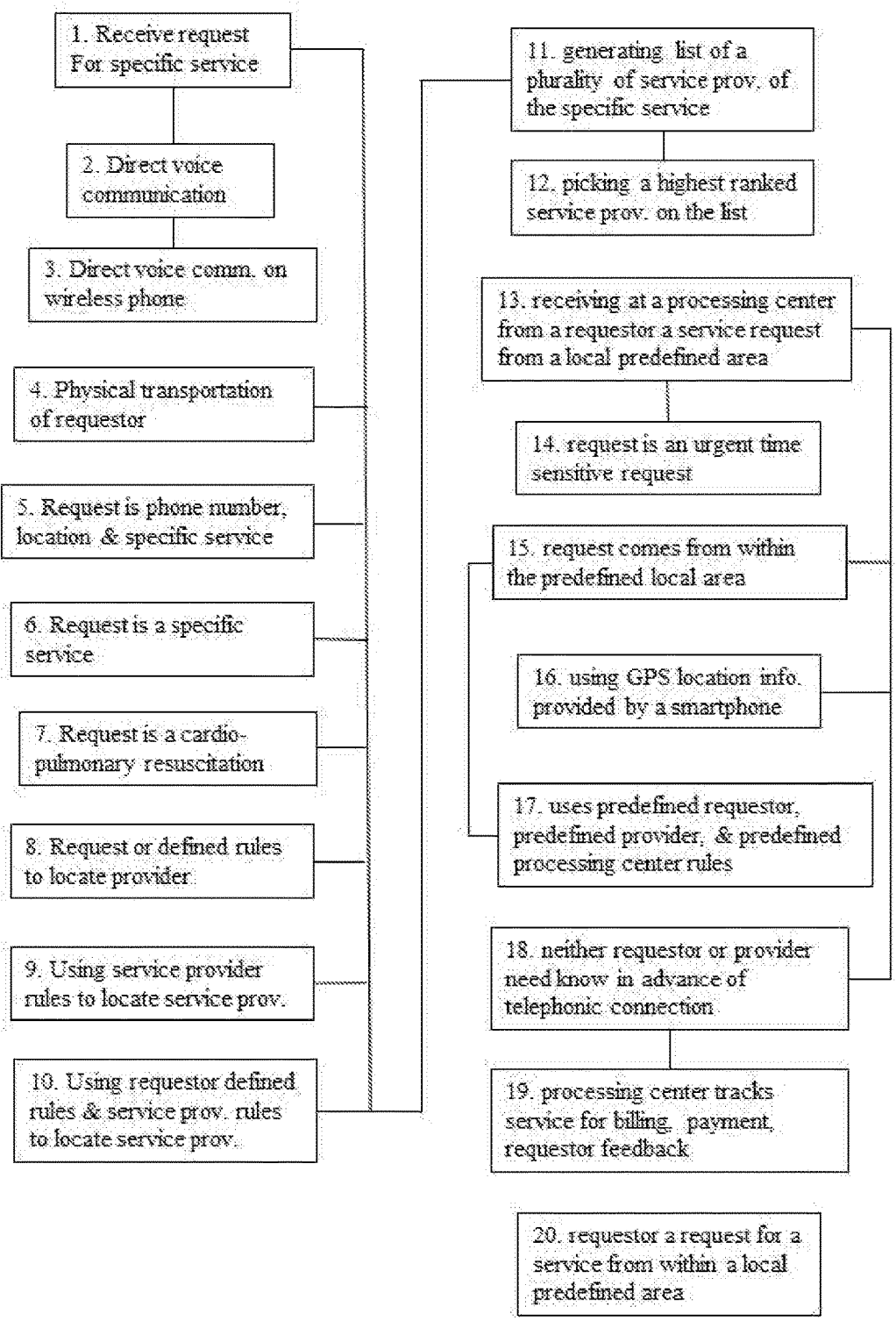
FIG. 8 illustrates various embodiments of the invention.

FIG. 8 illustrates various embodiments of the present invention. At 1. A method comprising: receiving from a requestor a request for a specific service; locating a service provider of said specific service; and putting said requestor and said service provider in direct communication. At 2. The method of claim 1 wherein said direct communication is direct voice communication. At 3. The method of claim 2 wherein said direct communication is a voice communication on a wireless telephone. At 4. The method of claim 1 wherein said specific service is physical transportation of said requestor. At 5. The method of claim 1 wherein said request consists of a phone number, a location, and said specific service. At 6. The method of claim 1 wherein said request consists of only said specific service. At 7. The method of claim 1 wherein said request consists of only a cardiopulmonary resuscitation request. At 8. The method of claim 1 wherein said locating a service provider of said specific service further comprises using requestor defined rules to locate said service provider. At 9. The method of claim 1 wherein said locating a service provider of said specific service further comprises using service provider defined rules to locate said service provider. At 10. The method of claim 1 wherein said locating a service provider of said specific service further comprises using requestor defined rules and using service provider defined rules to locate said service provider. At 11. The method of claim 10 wherein said locating a service provider further comprises generating a list of a plurality of service providers of said specific service. At 12. The method of claim 11 wherein said putting further comprises picking a highest ranked service provider on said list based on a combined highest requestor defined rule ranking and a service provider defined rule ranking and when two or more providers have a same highest ranking then picking a single service provider at random from said two or more providers having said same highest ranking. At 13. A method comprising: receiving at a processing center from a requestor a request for a service from within a local predefined area; generating a ranked list of providers that provide said service within said local predefined area; using said ranked list in a highest ranked to lowest ranked order and a reverse call center to locate a live person at a provider of said service; and telephonically connecting said live person and said requestor. At 14. The method of claim 13 wherein said request is an urgent time sensitive request. At 15. The method of claim 13 wherein said request comes from within said predefined local area. At 16. The method of claim 13 wherein said request comes from within said predefined local area as determined by said processing center by using GPS location information provided by a smartphone used by said requestor. At 17. The method of claim 15 wherein said generating said ranked list of providers uses predefined requestor rules, predefined provider rules, and predefined processing center rules. At 18. The method of claim 13 wherein neither said requestor or said provider need know in advance of said telephonic connection any information about the other. At 19, The method of claim 18 wherein said processing center tracks said service for billing, payment, requestor feedback, loyalty program participation, and post service action. At 20. An apparatus comprising: means for receiving at a processing center from a requestor a request for a service from within a local predefined area; means for generating a ranked list of providers that provide said service within said local predefined area; means for using said ranked list in a highest ranked to lowest ranked order and a reverse call center to locate a live person at a provider of said service; and means for telephonically connecting said live person and said requestor.

Thus a method and apparatus for Multimedia Alert and Response System for Urgent and Local Requests have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a specialized computer system in which the techniques of the present invention may be practiced as well as implemented as an embodiment).

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "instant" or similar phrases are used to indicate that from the perspective of the user the action is in real time and not of a delayed nature. For example, an "instant" connection is one that appears immediate and is not delayed from perspective of the user. For example, "instant voice interaction" is one that appears to have no delay to the user (e.g. picking up the phone, saying hello, and starting a conversation).

As used in this application an "urgent time sensitive request" or "time sensitive request" or "urgent request" or similar phrases are used to indicate a request where delay of even a few minutes in response may result in great bodily harm or the death of a person.

As used in this description find-me or find me or similar phrases refers to the ability to receive incoming calls at any location or phone calls to be received at different locations on different phone.

As used in this description follow-me or follow me or similar phrases refers to the ability to receive calls at any number of designated phones, whether the designated phone are all ringing at once, or in a sequence.

As used in this description find-me-follow-me or find me follow me or similar phrases refers to the ability of find-me and follow-me in combination or incoming phone calls to be received at different locations, on different phones. Find-me may be implemented in a variety of ways, for example, but not limited to, forwarding a call in sequence to a predefined list or numbers or forwarding a call to all numbers in a predefined list simultaneously. Follow-me may be implemented in a variety of ways, for example, but not limited to, forwarding calls to a predefined list of numbers based on a criteria, for example, time of day.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for Multimedia Alert and Response System for Urgent and Local Requests have been described.

What is claimed is:

1. A method of processing calls from a requestor to a service provider comprising:
    a) receiving a request for service from the requestor through any media channel;
    b) determining whether the request for service complies with one or more desired rule(s) from both the requestor and the service provider;
    c) if it does, then ranking the service provider by how well they comply with the desired rule(s) from both sides;
    d) selecting a service provider that is highest ranked by how well it fits the one or more desired rule(s) from both sides;
    e) initiating contact with the selected service provider and determining whether agents at the service provider are available by pinging the agents and receiving from the agents their availability;
    f) if the agents at the selected service provider is available, activating the agents and putting said requestor and said agents in direct communication via a media channel;
    g) if an agent of the agents available at the selected service provider picks up the call, cancelling connections to other agents available at the selected service provider;
    h) if the agents at the selected service provider is not available, selecting an alternate service provider that fits one or more of the desired rules and repeating steps d) through g) as needed.

2. The method of claim 1 wherein if a step c), multiple service providers are ranked equally high by how well they fit the criteria, in step d), selecting the multiple service providers that are equally highly ranked, and in step e), initiating contact with multiple selected service providers, and from among those service providers that respond, selecting one with which to, in step f), establish direct communication between said requestor and the selected service provider.

3. The method of claim 1 wherein said service is physical transportation of said requestor.

4. The method of claim 1 wherein said request consists of a phone number, a location, and said specific service.

5. The method of claim 1 wherein said request consists of only a specific service.

6. The method of claim 1 wherein said request consists of only a cardiopulmonary resuscitation request.

7. The method of claim 1 wherein selecting a service provider of a specific service further comprises using requestor defined rules to locate said service provider.

8. The method of claim 7 wherein the requestor-defined rules comprise one or more of i) location nearest to requestor, ii) highest review ranking, iii) lowest fare, and iv) offering a loyalty program.

9. The method of claim 1 wherein selecting a service provider of a specific service further comprises using service provider defined rules to locate said service provider.

10. The method of claim 1 wherein selecting a service provider of said specific service further comprises using requestor defined rules and using service provider defined rules to locate said service provider.

11. The method of claim 10 wherein selecting a service provider further comprises generating a list of a plurality of service providers of the specific service.

12. The method of claim 11 wherein said selecting further comprises picking a highest ranked service provider on said list based on a combined highest requestor defined rule ranking and a service provider defined rule ranking and when two or more providers have a same highest ranking, then picking a single service provider at random from said two or more providers having said same highest ranking.

13. The method of claim 1 wherein if in step c), multiple service providers are ranked equally high by how well they fit the criteria, in step d), selecting the multiple service providers that are equally highly ranked, and in step e), initiating contact with the multiple selected service providers, and from among those service providers that respond, selecting one with which to, in step f), establish direct communication between said requestor and the selected service providers.

14. A method of processing calls from a requestor to a service provider comprising:
   a) receiving at a processing center from a requestor a request for a service from within a local predefined area;
   b) generating a ranked list of providers that provide said service within said local predefined area;
   c) using said ranked list in a highest ranked to lowest ranked order, determining whether agents are currently available at the highest-ranked selected service provider by pinging each agent for their availability with the selected service provider and receiving from the agents their availability;
   d) if the agents are available at the highest-ranked selected service provider, telephonically connecting said agent and said requestor;
   e) if an agent of the agents available at the highest-ranked selected service provider picks up the call, cancelling connections to other agents available at the highest ranked selected service provider;
   f) if the agents are are not available at the highest-ranked selected service provider, determining whether agents are currently available at the next ranked service provider by initiating contact with the next ranked service provider by pinging each agent for their availability and receiving from the agents their availability;
   g) if agents are available at the next ranked service provider, telephonically connecting said agent and said requestor; and
   h) if an agent of the agents available at the next ranked service provider picks up the call, cancelling connections to other agents available at the next ranked service provider.

15. The method of claim 14 wherein said request comes from within said predefined local area.

16. The method of claim 15 wherein said generating said ranked list of providers uses predefined requestor rules, predefined provider rules, and predefined processing center rules.

17. The method of claim 14 wherein said request comes from within said predefined local area as determined by said processing center by using GPS location information provided by a smartphone used by said requestor.

18. The method of claim 14 wherein said processing center tracks said service for billing, payment, requestor feedback, loyalty program participation, and post service action.

19. The method of claim 14 wherein the providers are ranked based on one or more criteria selected from the group consisting of i) location nearest to requestor; ii) highest review ranking, iii) lowest fare; iv) offering a loyalty program, v) a SET of requestor's own rules, and vi) handicap-capable vehicle.

* * * * *